United States Patent
Woodward et al.

(10) Patent No.: US 9,915,791 B2
(45) Date of Patent: Mar. 13, 2018

(54) METHOD OF LASER POLISHING A CONNECTORIZED OPTICAL FIBER AND A CONNECTORIZED OPTICAL FIBER FORMED IN ACCORDANCE THEREWITH

(71) Applicant: NANOPRECISION PRODUCTS, INC., El Segundo, CA (US)

(72) Inventors: Ryan H. Woodward, Rancho Palos Verdes, CA (US); Yang Chen, Thousand Oaks, CA (US); Robert Ryan Vallance, Newbury Park, CA (US); Eric Jaquay, El Segundo, CA (US)

(73) Assignee: NANOPRECISION PRODUCTS, INC., El Segundo, CA (US)

( * ) Notice: Subject to any disclaimer, the term of this patent is extended or adjusted under 35 U.S.C. 154(b) by 0 days.

(21) Appl. No.: 14/940,141

(22) Filed: Nov. 12, 2015

(65) Prior Publication Data

US 2016/0187592 A1    Jun. 30, 2016

Related U.S. Application Data

(60) Provisional application No. 62/078,868, filed on Nov. 12, 2014.

(51) Int. Cl.
  *G02B 6/38*  (2006.01)
  *B23K 26/00*  (2014.01)
  *B23K 103/00*  (2006.01)

(52) U.S. Cl.
  CPC ........ *G02B 6/3863* (2013.01); *B23K 26/0075* (2013.01); *B23K 2203/54* (2015.10); *G02B 6/3854* (2013.01); *G02B 6/3885* (2013.01)

(58) Field of Classification Search
  CPC .. G02B 6/3854; G02B 6/3863; G02B 6/4488; G02B 2006/12197; B23K 26/0075
  See application file for complete search history.

(56) References Cited

U.S. PATENT DOCUMENTS

| 4,492,060 A | 1/1985 | Clark |
| 4,510,005 A | 4/1985 | Nijman |
| 4,932,989 A | 6/1990 | Presby |

(Continued)

FOREIGN PATENT DOCUMENTS

| JP | 07146415 A * | 6/1995 | ............... G02B 6/13 |
| JP | 2001-221921 | 8/2001 | |

OTHER PUBLICATIONS

International Search Report of Counterpart PCT International Application No. PCT/US2015/060489.

(Continued)

*Primary Examiner* — Daniel Petkovsek
(74) *Attorney, Agent, or Firm* — Liu & Liu

(57) ABSTRACT

Laser polishing is achieved by directing laser beam perpendicular at the fiber end face in a connectorized optical fiber having a metal ferrule. The spot size of the laser beam is larger than the bare optical fiber diameter, providing a more uniform spatial distribution of the radiation energy over the fiber end face. The metal ferrule provides heat conduction to prevent excessive heat built up at the fiber tip, which would lead to undesirable surface defects and geometries. The connectorized optical fiber may be pre-shaped prior to laser polishing. Subsequent laser polishing flattens the fiber end face.

20 Claims, 9 Drawing Sheets

(56) References Cited

U.S. PATENT DOCUMENTS

| | | |
|---|---|---|
| 5,226,101 A | 7/1993 | Szentesi et al. |
| 5,317,661 A | 5/1994 | Szentesi et al. |
| 5,421,928 A | 6/1995 | Knecht et al. |
| 5,772,720 A | 6/1998 | Taira-Griffin et al. |
| 5,906,686 A * | 5/1999 | McNeil .................... B08B 3/12 134/1 |
| 5,966,485 A | 10/1999 | Luther et al. |
| 5,983,676 A | 11/1999 | Brown |
| 6,413,450 B1 | 7/2002 | Mays, Jr. |
| 6,534,741 B2 | 3/2003 | Presby |
| 6,738,544 B2 | 5/2004 | Culbert et al. |
| 6,774,341 B2 | 8/2004 | Ohta |
| 6,827,501 B2 * | 12/2004 | Yasuda ................ G02B 6/3807 385/80 |
| 6,951,994 B2 | 10/2005 | Mays, Jr. |
| 7,082,250 B2 | 7/2006 | Jones et al. |
| 7,216,512 B2 | 5/2007 | Danley et al. |
| 7,377,700 B2 | 5/2008 | Manning et al. |
| 7,695,201 B2 | 4/2010 | Douglas et al. |
| 8,109,679 B2 | 2/2012 | Danley et al. |
| 8,340,485 B2 | 12/2012 | Danley et al. |
| 8,477,298 B2 | 7/2013 | Sutherland |
| 8,523,459 B2 | 9/2013 | Danley et al. |
| 8,573,856 B2 | 11/2013 | Webb et al. |
| 8,740,474 B2 * | 6/2014 | Lu ..................... B29D 11/0075 156/153 |
| 8,840,318 B2 * | 9/2014 | Baca .................... G02B 6/3854 385/62 |
| 8,915,100 B2 | 12/2014 | Tachikura et al. |
| 9,205,610 B1 | 12/2015 | Danley |
| 9,645,313 B2 | 5/2017 | Akarapu et al. |
| 2006/0137403 A1 | 6/2006 | Barr et al. |
| 2012/0269488 A1 | 10/2012 | Danley et al. |
| 2014/0199027 A1 | 7/2014 | Miller |
| 2015/0355416 A1 * | 12/2015 | Liu ..................... G02B 6/3863 65/378 |

OTHER PUBLICATIONS

Paek, U.C. and A. L. Weaver, "Formation of a spherical lens at optical fiber ends with a CO2 laser", Applied Optics. vol. 14 No. 2, Feb. 1975, pp. 294-298.

Boyd et al, "High precision 9.6 µm CO2 laser end-face processing of optical fibers", Optics Express. vol. 23 No. 11, Jun. 2015, pp. 15065-15071.

Heptonstall et al, "Enhanced characteristics of fused silica fibers using laser polishing", Classical and Quantum Gravity, vol. 31, 2014, 105006, pp. 1-14.

Heptonstall et al, "CO2 laser production of fused silica fibers for use in interferometric gravitational wave detector mirror suspensions", Review of Scientific Instruments 82, 011301, Jan. 2011, pp. 1-9.

Nowak et al, "Efficient laser polishing of silica micro-optic components", Applied Optics. vol. 45 No. 1, Jan. 2006, pp. 162-171.

Udrea et al, "Laser polishing of optical fiber end surface", Optical Engineering, vol. 40 No. 9, Sep. 2001, pp. 2026-2030.

Hutsel et al, "Accurate cross-sectional stress profiling of optical fibers", Applied Optics. vol. 48 No. 26, Sep. 2009, pp. 4985-4995.

Thomes, Jr. et al, "Fiber Optic Cables for Transmission of High-Power Laser Pulses in Spaceflight Applications", ICSO 2010 International Conference on Space Optics, Rhodes, Greece, Oct. 4-8, 2010, pp. 1-6.

* cited by examiner

*Image A*         *Image B*

Fiber 1 End Face
Laser Polish
HeNe Illuminator

Fiber 1 End Face
12um Pre-Polish
HeNe Illuminator

| Standard | Single-mode insertion loss (IL) | Single-mode return loss (RL) |
|---|---|---|
| Verizon TPR.9409 | Requirement: < 0.2 dB | Requirement: < -55 dB |
| GR-326-CORE i4 | Requirement: < 0.4 dB<br>Objective: < 0.2 dB | Requirement: < -40 dB<br>Objective: < -55 dB |
| TIA-568-C.3 | Requirement: < 0.75 dB | Requirement: < -26 dB<br>Requirement: < -55 dB for analog video |
| IEC 60874-14-2 | Requirement: < 0.6 dB | Requirement: < -26 dB |
| nPP Ferrolder (without sorting) | Average: 0.15 dB<br>Maximum: 0.30 dB | Average: -55 dB<br>Maximum: -52 dB |

FIG. 9

METHOD OF LASER POLISHING A CONNECTORIZED OPTICAL FIBER AND A CONNECTORIZED OPTICAL FIBER FORMED IN ACCORDANCE THEREWITH

PRIORITY CLAIM

This application claims the priority of U.S. Provisional Patent Application No. 62/078,868 filed on Nov. 12, 2014, which is fully incorporated by reference as if fully set forth herein. All publications noted below are fully incorporated by reference as if fully set forth herein.

BACKGROUND OF THE INVENTION

Field of the Invention

The present invention relates to optical fibers, and more particularly to the finishing of the end face of an optical fiber.

Description of Related Art

There are many advantages to transmitting light energy via optical fiber waveguides and the use thereof is diverse. Single or multiple fiber waveguides may be used simply for transmitting visible light to a remote location. Complex communication systems may transmit multiple specific optical signals. These devices often require the coupling of optical fibers in end-to-end relationship, to effectively place the end faces of the two optical fibers in face-to-face juxtaposition with little or no space between them. This face-to-face optical coupling represents a source of light loss. The cleaved end of the optical fiber and the waveguide at the center of the fiber should be smooth and defect-free.

If the ends of the fiber are uneven, excessive light loss can result due to reflection and refraction of light at the cleaved end surface (e.g., a splice or juncture region). Roughness of the optical surface presents limits in the efficiency of optical signal transmissions by both scattering light and introducing contact gaps in the mating of connectors. When placing optical fibers in end-to-end relationship, to minimize light loss from back reflection from the interior of the end face of the transmitting fiber and to minimize insertion loss, e.g. the loss of signal strength in transmission from one fiber to the other, the cleaved fiber end face needs to be smooth and scratch free as possible to optimize optical coupling between fibers (e.g., in demountable connectors, permanent splices and photonic devices).

Given the imperfections created at the cleaved ends of the fibers, current termination approaches involve conventional cleaving of the optical fiber followed by mechanical polishing of the resultant end face to eliminate imperfections of the cleaved face non-planar form. Traditional methods using various grinding and polishing steps have been around for decades as a means to remove surface roughness. Finishing of the end faces of the fibers involves a laborious procedure which entails placing a quantity of an uncured epoxy in the passage of a zirconia terminal ferrule into which the fiber is to be inserted. The fiber is inserted into the ferrule and pushed through the epoxy at the end face of the ferrule to ensure that at least some of the epoxy is pushed out beyond the end face of the ferrule to provide a firm support for the optical fiber while it is hand-polished to smooth its face. After positioning the fiber and before polishing, the epoxy is cured for about twenty-four hours. An end portion of the fiber that protrudes from the ferrule and cured epoxy is broken off close to the end face of the ferrule. A small portion of the fiber, after being broken off, protrudes from the end face of the ferrule and is firmly supported by the cured epoxy. The epoxy also projects a small distance from the end face of the ferrule, and also supports the fiber within the ferrule passage. This rigid support for the fiber is necessary to enable it to withstand the abrasive action of an abrasive disc that has one of a predetermined number of different hardness. This disc is pressed against the end of the fiber to indent the disc face a small amount by the pressure of the fiber end. The disc is caused to slide over the end face of the fiber. This abrasive disc grinding is accomplished by hand or with automated machinery, and it is interrupted on occasion to inspect the end face and to measure the amount of back reflection. Disc faces and disc hardness may be changed during this procedure.

U.S. Pat. No. 4,979,334 disclosed an automated mechanical polishing device that houses numerous connectors. However, mechanical polishing processes cause the surface of silica glasses to form a thin layer of glass with a higher index of refraction that is only hundreds of nanometers thick; this phenomena was originally reported by Lord Rayleigh in 1937 [L. Rayleight, "The surface layer of polished silica and glass with further studies on optical contact", Proceedings A of the Royal Society, V. 160, No 3, 1937]. This thin layer of glass with a larger index of refraction causes light to reflect back from the interface between two polished optical fibers mated in fiber-optic connector. Attempts have been made previously to improve the surface finish and/or remove the damaged layer with high index of refraction on an optical fiber end surface by methods other than the standard mechanical polishing. U.S. Pat. No. 5,226,101 disclosed a schematic for laser polishing a fiber using a CW (continuous wave) CO2 laser. Udrea et al. reported achieving an improvement of surface roughness from 2.5 μm to less than 100 nm with a loss decrease of 1.5 dB after laser irradiation [M. Udrea, H. Orun, "Laser polishing of optical fiber end surface," Optical Engineering 40(9), 2026-2030 (2001).]. Alternate designs that implement laser cleaving with additional polishing steps have also been designed. US2005/0008307A1 discloses a technique to thermally shape the end face of optical fiber that has had the cladding removed. U.S. Pat. No. 7,082,250 disclosed a technique to laser cleave a connectorized fiber (i.e., an end of the optical fiber is fixed in a ferrule, and the optical fiber is not demounted from such ferrule after final polishing of its end face; the optical fiber and ferrule may be assembled into a connector) and then perform an additional step of fine mechanical polishing.

While the prior art laser shaping/polishing processes may reduce high back reflections by reducing surface roughness, a high index layer is still being introduced, which are often viewed as fundamental problems. The melting of the fiber material at the fiber end face creates a convex surface having a radius of curvature on the order of the radius or diameter of the fiber. This results in undesirable optical effects, unless this convex surface is further shaped by mechanical grinding. Further, polishing not just bare fiber but connectorized fiber still remains an issue. A major concern in laser polishing of a connectorized fiber is the epoxy used and the material properties of ceramic. Epoxy typically absorbs the laser energy and subsequently melts, burns, or vaporizes at the high power densities required to soften or melt the fiber; this which contaminates the end face of the optical fiber and needs to be removed and it compromises the retention of the fiber within the ferrule. Ceramic ferrules also absorb energy from the laser beam, and due to their low thermal conductivity, rapid temperature changes during the laser treatment can introduce cracking in the zirconia (ZrO2) and alumina (Al2O3) ferrules. The energy can even be sufficiently high as to vaporize the end faces of the ferrules, altering their endface geometry. Further, the prior methods require precision alignment of the applied laser beam, and additional fine polishing steps after the application of the laser, which increases burden and complexity in manufacturing, and which could result in a high index layer.

The drawbacks of the prior art fiber end face polishing processes posed significant challenges to meet the stringent specifications set forth by prevailing industry standards, such as GR-326-CORE (Generic Requirements for Singlemode Optical Connectors and Jumper Assemblies, Issue 4). Such standards set forth various requirements, including the polish radius (defined as the radius of the ferrule end-face surface as measured from the ferrule axis), the fiber protrusion and undercut (defined as the distance between the top of the glass fiber as measured against the surrounding material in a spherical plane), the ferrule apex offset (measured as the distance between the spherical center of the polished end-face and the center of the fiber), and angled polish (defined as the angle at which the ferrule end face is polished, relative to the axis perpendicular to the ferrule axis).

Given the shortcomings of the prior art laser polishing processes, it remains desirable to develop an improved laser polishing process to provide for finishing an optical fiber end face while minimizing or avoiding the above-mentioned problems.

SUMMARY OF THE INVENTION

The present invention provides a novel method of forming a connectorized optical fiber cable, including a process of laser polishing the end face of a connectorized optical fiber. The laser polishing process in accordance with the present invention provides an effective, efficient and reliable approach to finishing optical fiber end faces to achieve acceptable surface geometries and surface properties (e.g., smoothness).

In accordance with one aspect of the present invention, laser polishing is performed on a cleaved end face of a connectorized optical fiber that has been terminated by mounting in a metal ferrule. For purpose of the present invention, a connectorized optical fiber comprising an optical fiber terminated by fixedly mounting in a metal ferrule, and the optical fiber is not demounted from such ferrule after subsequent polishing/finishing of its end face (the optical fiber and the ferrule may be assembled into a connector). The metal ferrule includes a body having a groove for receiving a bare terminating end section of the optical fiber (i.e., including core with cladding exposed, without protective buffer coating and jacket layers). In one embodiment, the ferrule is defined by a body having a bore or groove sized to securely retain the bare optical fiber. In a further embodiment, the body is defined by two ferrule halves, which may be identical (the ferrule halves each has a semi-cylindrical-shaped grove; the ferrule halves clamp the bare optical fiber), or different (e.g., one of the ferrule halve has a U-shaped groove that secured retain the bare optical fiber, and the other ferrule halve does not have a groove). No adhesive (e.g., epoxy) is applied between the bare optical fiber and the ferrule. In one embodiment, the ferrule (or ferrule halves) may be formed by precision stamping a metal blank, to accurately define the dimension and geometries of the external and internal surface features of the ferrule (or ferrule halves), so that the ferrule can accurately align the axis of the optical fiber to an external connection point (e.g., using a sleeve to optically couple to a connecting ferrule holding a connecting optical fiber).

The laser beam is directed perpendicular to the end face of the optical fiber, or generally along and/or parallel to the longitudinal axis of the optical fiber. In one embodiment, the laser beam is defocused so that the spot size is larger than the bare optical fiber diameter (e.g., a spot size several times the diameter of the bare fiber or fiber end face). Incident radiation energy is reflected by the surface of the metal ferrule. Consequently, the central portion of the Gaussian (TEM00) mode of the laser is applied to the optical fiber. This provides a more uniform spatial distribution of the radiation energy over the area of the end face of the fiber, which results in less reshaping of the end face. Therefore, no rotation of the fiber about its axis is required to maintain axial symmetry. Given the relatively large spot size of the laser beam compared to the diameter of the bare fiber end face, the laser beam does not need to be precisely aligned to the fiber end face (i.e., the optical axis of the laser beam is misaligned with center of the fiber end face).

In accordance with the present invention, the metal ferrule provides heat conduction to prevent excessive heat built up at the fiber tip, which could vaporize the material of the optical fiber and/or cause optical changes in the optical fiber (e.g., as a result of diffusion of dopants (e.g., fluorine and germanium) within the cladding and core of the fiber, and/or as a result of thermo-mechanical residual stress to avoid stress-induced birefringence in the optical fiber). The fiber tip/end face is softened or slightly melted (e.g., to about 10 microns) by the laser beam to repair typical surface defects but does not appreciably change the shape of the fiber tip/end face, since the material of the optical fiber is not vaporized or excessively softened. The metal ferrule does not absorb radiation of the laser beam, as it reflects the laser beam.

The laser polished end face of the optical fiber achieves desired surface geometries and surface properties, without requiring subsequent mechanical grinding and/or polishing. This avoids formation of a high index layer normally introduced by such mechanical processing.

In one embodiment, the connectorized optical fiber is pre-shaped (e.g., by mechanical grinding or laser shaping) prior to laser polishing. The end face of the optical fiber (and the end face of the ferrule) is pre-shaped to achieve the desired fiber undercut/protrusion (e.g., −150 nm undercut/+50 nm protrusion) with respect to the ferrule end face. As a result of such preshaping process, a slight convex surface is obtained. It has been found that the laser polishing process in accordance with the present invention could "relax" the convex surface to achieve a more desirable flatter fiber end face (i.e., the radius of curvature of the fiber end face is larger after laser polishing as compared to the radius of curvature of the fiber end face prior to laser polishing). Further, in the presence of a high index layer introduced by previous mechanical polishing at the fiber end face, it has been found that the laser polishing process in accordance with the present invention could also cause the fiber material in such layer to reduce in index of refraction, thus further reducing return losses.

In another aspect of the present invention, a connectorized optical fiber (e.g., in an optical fiber jumper cable) is formed in accordance with a process involving the novel laser polishing process discussed above. The process involves mounting an optical fiber in a metal ferrule, cleaving the optical fiber close to the end face of the ferrule (alternatively, a cleaved length of optical fiber is mounted in the metal ferrule, with the fiber end face substantially aligned with the ferrule end face), pre-shaping the fiber end face (and ferrule end face) (e.g., by mechanical grinding or laser cleaving/shaping), and laser polishing the fiber end face in accordance with the present invention.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIG. 9 is a table of industry standards concerning insertion loss and return loss, including comparison to loss data of connectorized optical cable laser polished in accordance with the present invention.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention provides a novel method of forming a connectorized optical fiber cable, including a process of laser polishing the end face of a connectorized optical fiber. The laser polishing process in accordance with the present invention provides an effective, efficient and reliable approach to finishing an optical fiber end face to achieve acceptable surface geometries and surface properties (e.g., smoothness and shape).

In accordance with the present invention, laser polishing is performed on a cleaved end face of a connectorized optical fiber that has been terminated by mounting in a metal ferrule. For purpose of the present invention, a connectorized optical fiber comprising an optical fiber terminated by fixedly mounting in a metal ferrule, and the optical fiber is not demounted from such ferrule after subsequent polishing/finishing of its end face. The connectorized optical fiber may be further terminated, with the optical fiber and the ferrule assembled into an optical connector.

Figure 1:
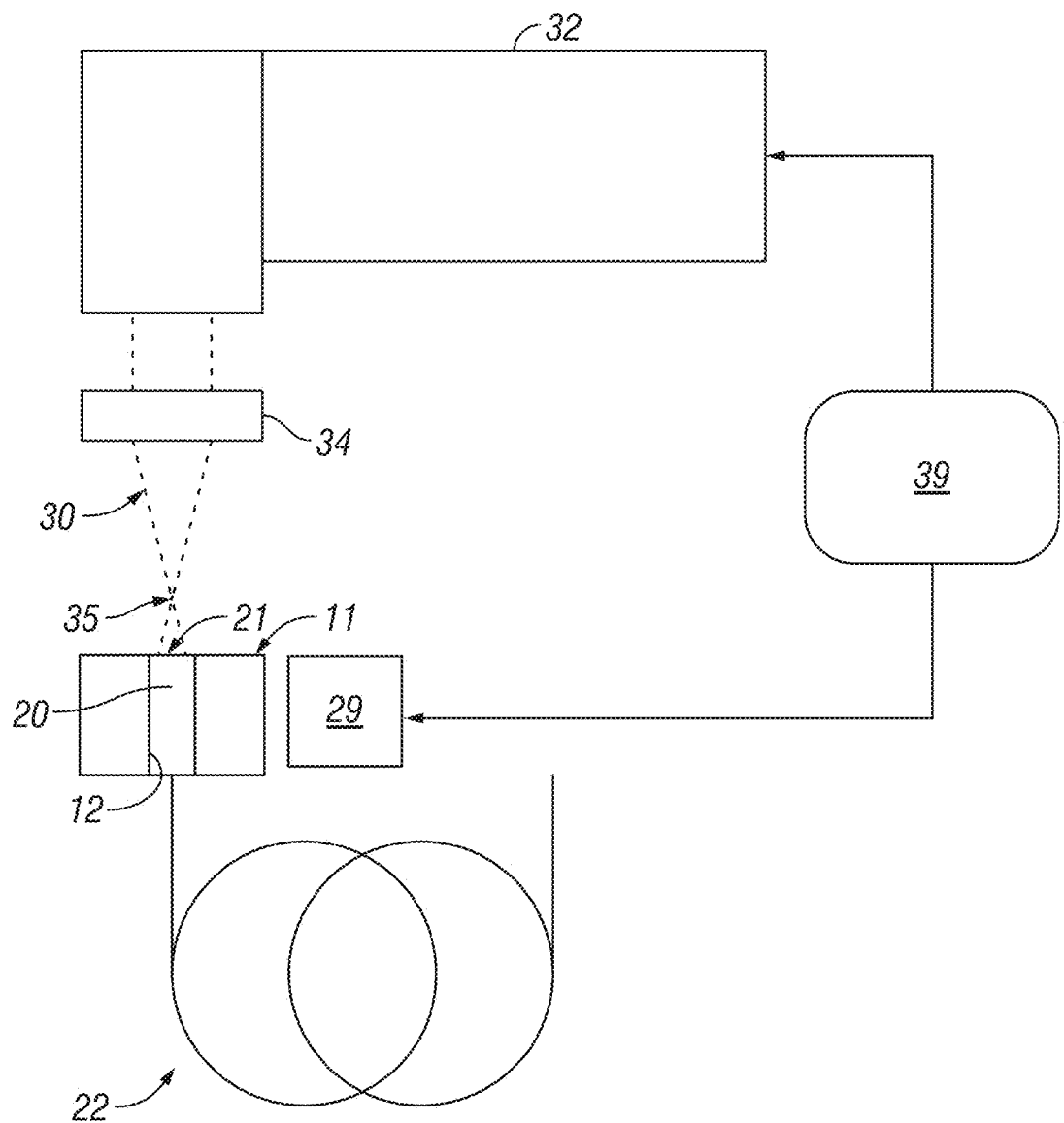
FIG. 1 is a schematic representation of a system applying the method of laser polishing a connectorized optical fiber, in accordance with one embodiment of the present invention.

Referring to the schematic illustration of FIG. 1, the connectorized optical fiber cable 22 includes a length of optical fiber 20 fixedly mounted in a metal ferrule 10. The metal ferrule 10 includes a metal body (e.g., titanium) having a groove for receiving a bare terminating end section of the optical fiber 20 (i.e., including core with cladding exposed, without protective buffer coating and jacket layers). (Hereinafter, when referring to the optical fiber being held in a ferrule, it is understood that it is the bare section of the optical fiber that is being held in the ferrule.) The optical fiber 20 may be a single-mode fiber such as Corning SMF 28e or bend insensitive fiber such as Draka 9/125 BendBright XS SMF. The metal ferrule has an overall cylindrical metal body, with a cylindrical bore 12 through which the fiber 20 is mounted. The fiber end face 21 may protrude slightly above or recess slightly below the ferrule end face 11 (e.g., within acceptable specification required by industry standards). Depending on how the fiber 20 is cleaved, and whether a pre-laser polish grinding is undertaken (see discussions further below), the end face 21 has a certain roughness that can be reduced by laser polishing disclosed herein.

Figure 2:
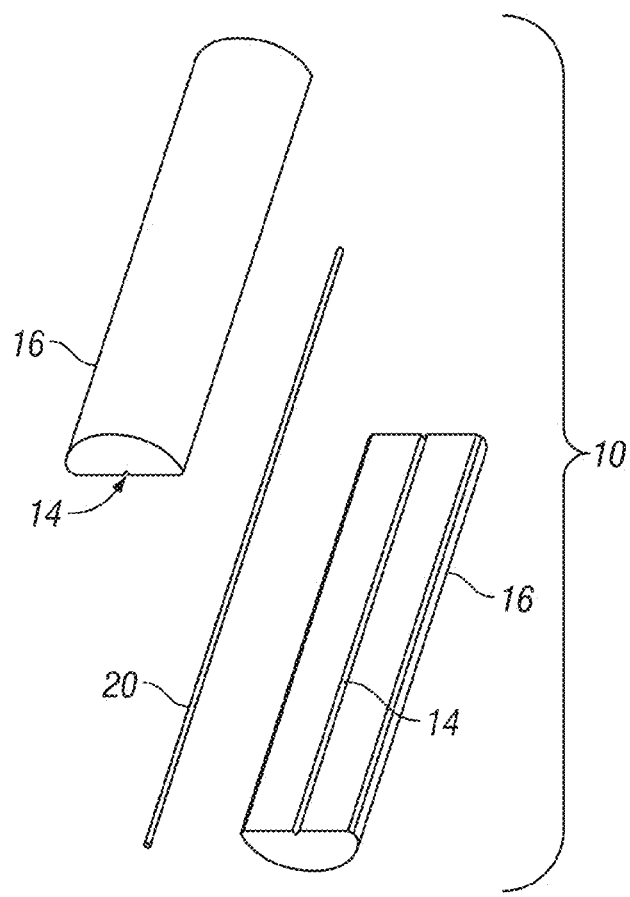
FIG. 2 is a perspective of a pair of metal ferrule halves for holding an optical fiber for laser polishing, in accordance with one embodiment of the present invention.

In one embodiment, the body of the metal ferrule 10 is defined by two ferrule halves, which may be identical. See, for example, U.S. Pat. No. 7,311,449, which is commonly assigned to the assignee of the present application and fully incorporated by reference herein, discloses various embodiments of complementary pairs of ferrule halves, each having a generally semi-cylindrical groove, which together define a bore that securely retains the optical fiber when the ferrule halves clamp on the optical fiber. FIG. 2 illustrates one embodiment of the metal ferrule 10 in FIG. 1. The optical fiber 20 is held in the grooves 14 in identical metal ferrule halves 16, with the grooves 14 together defining the bore 12 of the ferrule 10. The two metal ferrule halves 16 are fixedly attached to each other, e.g., by laser welding along the seams.

Figure 3:
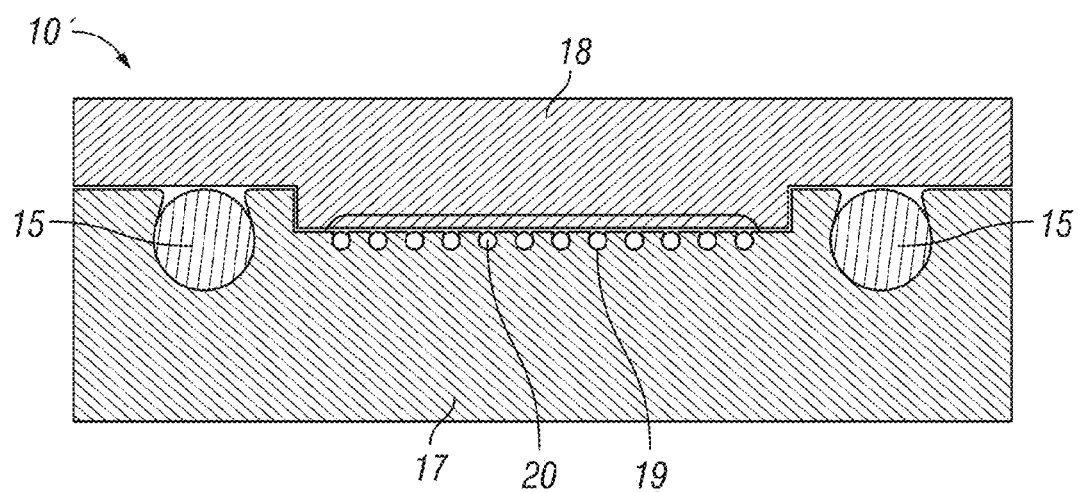
FIG. 3 is a sectional view of a multi-fiber metal ferrule for holding optical fibers for laser polishing, in accordance with another embodiment of the present invention.

In another embodiment, the metal ferrule is defined by a body having a groove sized to securely retain the bare optical fiber. See, for example, U.S. Pat. No. 8,961,034, which is commonly assigned to the assignee of the present application and fully incorporated by reference herein, discloses a metal ferrule having a generally U-shaped groove, which is sized to clamp the optical fiber to thereby securely retain the optical fiber in the groove. FIG. 3 illustrates an embodiment of a multi-fiber ferrule 10', comprising a metal ferrule 17 having grooves 19 for mounting multiple optical fibers 20, wherein each grooves 19 is a generally U-shaped sized to clamp an optical fiber 20. In this embodiment, the U-shaped grooves 19 are each a bore of the ferrule 10'. A ferrule cover 18 covers the grooves 19 to protect the ferrule 17. In this embodiment, additional grooves are provided in the ferrule 17 to receive alignment pins 15. This embodiment also represents a ferrule formed by two ferrule halves that are different, even though the ferrule cover 18 does not have a groove receiving an optical fiber. The fibers held in the multi-fiber ferrule 10' can be laser polished in a similar manner as described in connection with the single-fiber ferrule 10 herein.

The laser polishing process disclosed herein could be applied to connectorized optical fibers having other types of ferrules and connectors incorporating such, such as the oval shaped multi-fiber ferrules disclosed in PCT Patent Application Publication No. WO 2014/011283 A2 (which had been commonly assigned to the assignee of the present invention, and fully incorporated by reference herein).

Using the metal ferrules discussed above, no adhesive (e.g., epoxy) is or needs to be applied between the bare optical fiber 20 and the ferrule 10 (or 10'). In one embodiment, the ferrule (or ferrule halves) may be formed by precision stamping a metal blank, to accurately define the dimension and geometries of the external and internal surface features of the ferrule (or ferrule halves), so that the ferrule can accurately align the axis of the optical fiber to an external connection point (e.g., using a sleeve to optically couple to a connecting ferrule holding a connecting optical fiber). A precision stamping process and apparatus has been disclosed in U.S. Pat. No. 7,343,770, which is commonly assigned to the assignee of the present invention and fully incorporated by reference herein. The process and stamping apparatus disclosed therein may be adapted to precision stamping the ferrules discussed herein.

Referring back to FIG. 1, a laser beam 30 from a laser 32 (e.g., Universal Laser Systems ULR10 OEM CO2 laser) is directed generally perpendicular to the end face 21 of the optical fiber 20, or in a direction generally along or parallel to the longitudinal axis of the optical fiber 20. In the illustrated embodiment, the laser beam is focused by a lens 34 (e.g., a ThorLabs 75 mm focal length ZnSe plano-convex lens). The ferrule 10 may be supported on a stage 29 (schematically shown in FIG. 1) for aligning the fiber end face 21 to the laser beam 30. For a multi-fiber ferrule such as the ferrule 10' shown in FIG. 3, it can be supported on a stage that provides automatic indexing of each optical fiber mounted in the ferrule 10', so as to laser polish the fibers in turn. Alternatively, multiple laser beams may be applied to laser polish a number of fibers simultaneously. The operation and control of the laser 32 and the stage 29 may be controlled by a controller 39 (schematically shown).

Figure 4:
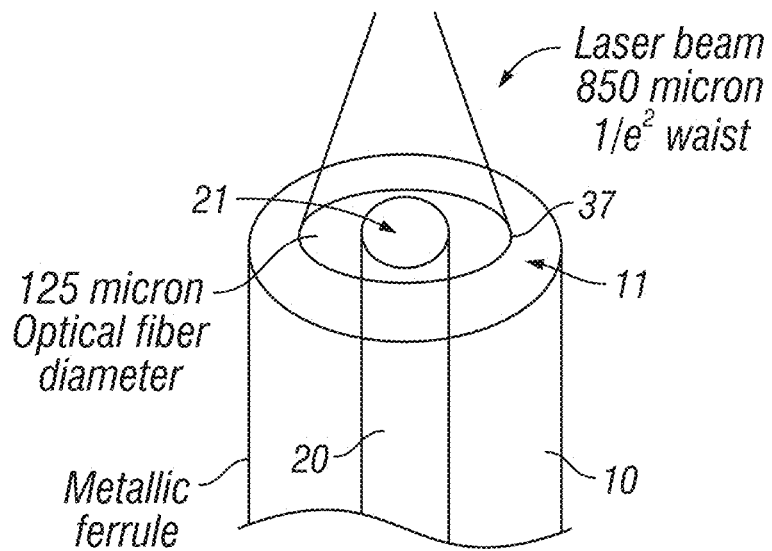
FIG. 4 is a schematic view of the fiber end face in relation to laser beam.
Figure 5:
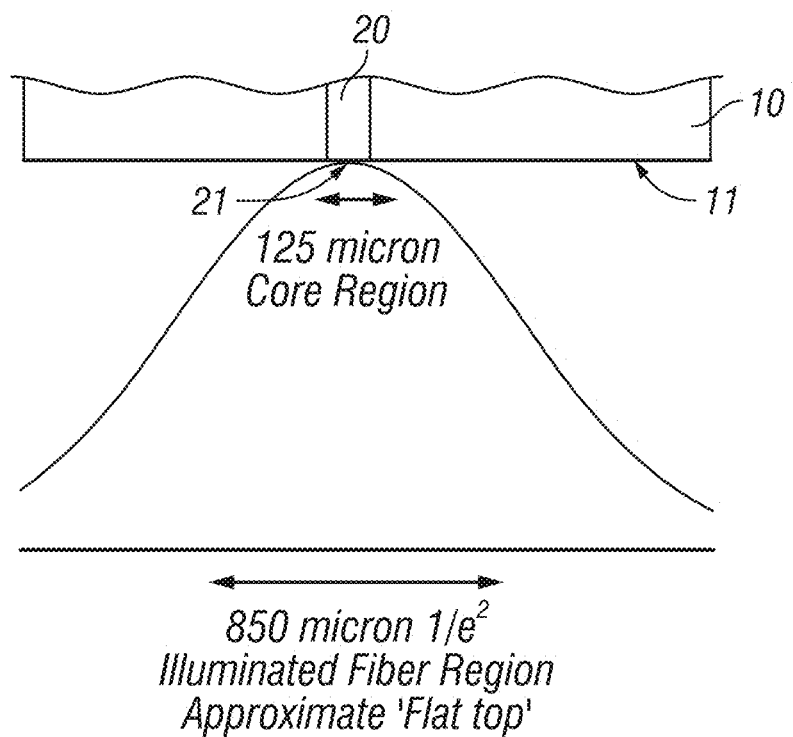
FIG. 5 is a diagram corresponding the relative sizes of the waist of the laser beam and the fiber core region.

Referring also to FIG. 4, the fiber end face 21 is positioned away from the focus 35 of the laser beam 30, so that the spot size 37 of the laser beam 30 is significantly larger than the bare optical fiber diameter (e.g., a spot size several times the diameter of the bare fiber or fiber end face). This is different from the prior art laser polishing processes, in which the laser beam is focused more closely at the fiber end face. As illustrated in FIG. 4, the laser beam spot size 37 on the fiber end face is 850 microns, which is about 7 times larger than the 125 microns diameter of the bare optical fiber (diameter of core and cladding only). Preferably, without limitation, the spot size may be 2 to 20 times larger than the end face diameter. Referring also to the embodiment illustrated in FIG. 5, the irradiated laser beam has a generally Guassian beam shape. The outputted beam waist was 4 mm with an M2 value ~1.4. The 75 mm focal length ZnSe plano-convex lens focuses the beam, but the connectorized fiber was placed 10 mm beyond the focus resulting in a roughly 850 μm $1/e^2$ waist (compared to about 40-micron in some of the prior art laser polishing processes). Consequently, the central portion of the Gaussian (TEM00) mode of the laser is applied to the optical fiber. As a result, the laser illuminated region on the narrower fiber end face 21 approximates a "flat top" beam shape, within the center portion of the wider laser beam spot size 37. This provides a more uniform spatial distribution of the radiation energy over the area of the end face of the fiber, which results in flatter and smoother end face after laser polishing. Therefore, no rotation of the fiber about its axis is required to maintain axial symmetry of the end face. Further, given the relatively large laser beam spot size 37 compared to the diameter of the bare fiber end face 21, the laser beam 30 does not need to be precisely aligned with the axis of the optical fiber 20, and may be generally aligned to the fiber end face 21 with a significant tolerance range. Given there is no adhesive between the bare fiber 20 and the surrounding ferrule 10, the wide laser beam spot would not melt or burned any adhesive, which could otherwise contaminate the fiber end face 21 or compromise the retention of the fiber within the ferrule by damaging the epoxy adhesive.

In one embodiment, the laser 32 has an output of 10 W, which is operated in a pulsed mode at a frequency of 10 kHz and a pulse duration of 60 μs with an exposure time of 2 s (total span of exposure). The 60% duty cycle resulted in an average output power of 8.5 W corresponding to an average power density of 15 W/mm$^2$ incident onto the fiber end face 21 (and the ferrule end face 11). Other power setting, duty cycle and exposure time may be applied. It is preferred that the power of the laser beam is chosen such that the temperature at the fiber end face/tip is maintained between the temperature at which the fiber material softens (glass transition temperature), and the temperature at which the fiber evaporates/vaporizes. As will be discussed further below, the laser polished fiber end face 21 is able to achieve return and insertion losses as well as surface roughness comparable to prior art mechanical polishing processes.

While the illustrated embodiment applies a laser beam having a Guassian beam shape, non-Gaussian beam shape such as a flat top, super Gaussian, or necklace beam shapes could be applied without departing from the scope and spirit of the present invention.

Incident radiation energy of the laser beam is not absorbed by the surface (including the end face 11) of the metal (e.g., Ti) ferrule 10 because metals are generally reflective to wavelengths of light emitted by CO2 laser (10.2 micrometers to 10.6 micrometers). In accordance with the present invention, the metal ferrule further provides effective heat conduction to prevent excessive temperature rise at the fiber tip, which could vaporize the material of the optical fiber and/or cause optical changes in the optical fiber (e.g., as a result of diffusion of dopants (e.g., fluorine and germanium) within the cladding and core of the fiber, and/or produce thermo-mechanical residual stress, to avoid stress-induced birefringence in the optical fiber). The fiber tip/end face is softened or slightly melted (e.g., to a depth of about 10 microns) by the laser beam to repair/smooth typical surface defects, but does not appreciably change the shape of the fiber tip/end face in an undesirable manner (see discussion below concerning effects of reshaping to a desirable larger radius of curvature), since the material of the optical fiber is not vaporized or excessively softened. The metal ferrule 10 absorbs no or little radiation of the laser beam, as it reflects the laser beam, so the metal ferrule 10 does not heat up appreciably. There is therefore little or no thermo-influence on the metal ferrule (such as phase change in the metal, e.g., Ti phase change from HCP to BCC at elevated temperature, or oxidation of Ti surface.)

The laser polished end face 21 of the optical fiber 20 achieves desired surface geometries (e.g., surface shape) and surface properties (e.g., roughness), without requiring subsequent mechanical grinding and/or polishing. This avoids formation of a high index layer normally introduced by such mechanical processing.

Figure 6:
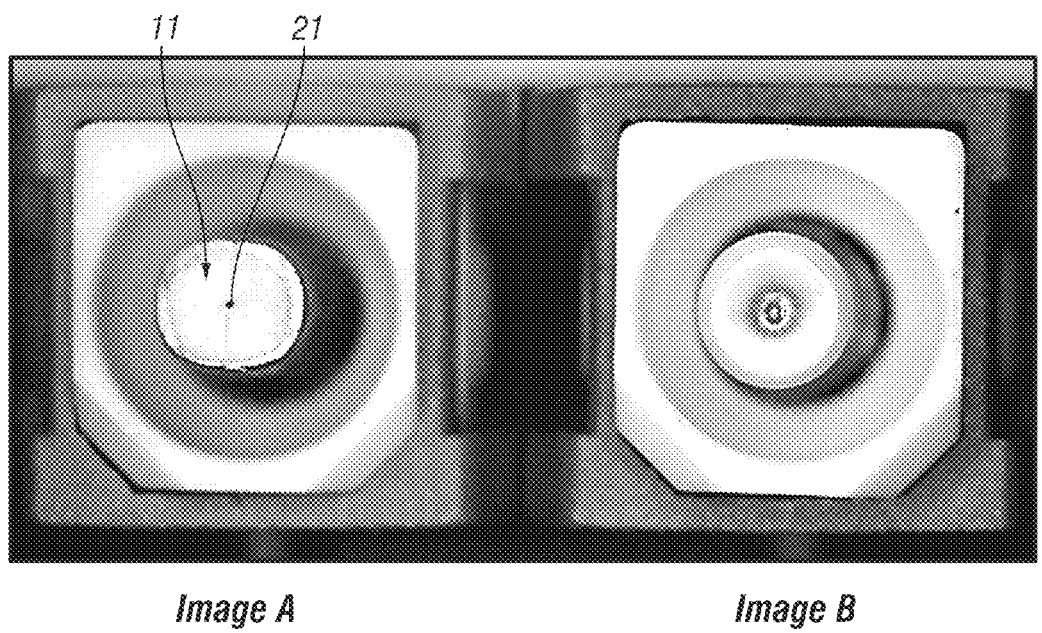
FIG. 6 is a side-to-side comparison of photo images of fiber/ferrule end faces that have been subject to laser polishing and no laser polishing.

FIG. 6 are photo images providing a qualitative side-by-side comparison of the end face region of the ferrule/fiber after laser polishing, illustrating the results achieved by mounting the optical fiber in a metal ferrule versus a ceramic ferrule. For Image A on the left of FIG. 6, the optical fiber is held in a Ti ferrule and subject to laser polishing, in accordance with the present invention. For Image B on the right of FIG. 6, the optical fiber is held in a zirconia ferrule and subject to laser polishing based with the same parameters for incident laser beam as for Image A, in accordance with the prior art approach to hold optical fiber in a non-metal ferrule for laser polishing (but with the laser beam parameters being chosen to match that in Image A for purpose of comparison). The Image A shows substantially no damage to the ferrule end face 11 and the fiber end face 21. However, Image B shows considerable damage, including evaporation of the glass fiber, evaporation and melting of the zirconia ferrule, phase changes in the zirconia, and cracking of the optical ferrule.

In another embodiment, the end face of the connectorized optical fiber is pre-shaped (e.g., by mechanical grinding and/or laser shaping) prior to laser polishing disclosed above. To meet certain industry standards, e.g., GR-326-CORE (Generic Requirements for Singlemode Optical Connectors and Jumper Assemblies, Issue 4) standards, it may be necessary to shape the ferrule end face with a desired surface profile prior to laser polishing the fiber end face. This is usually done by grinding the ferrule end face with a rough polish (e.g., using a 12-micron $AlO_2$ pad to hand polish for about 30 seconds, involving applied pressure and "figure 8" motion). During rough polishing process, the optical fiber held in the ferrule would likely be ground as well, thus leaving the fiber end face with a certain geometry and surface roughness. The laser polishing process in accordance with the present invention would reduce the surface roughness of the optical fiber, as disclosed above.

It is noted that after the rough polishing step, the end face of the optical fiber (and the end face of the ferrule) is pre-shaped to achieve a desired fiber undercut/protrusion (e.g., −150 nm undercut/+50 nm protrusion) with respect to the ferrule end face. As a result of such preshaping process, a slight convex surface is obtained at the fiber end face. Under prevailing industry standards, acceptable radius of curvature of the fiber end face should be between 7 to 25 mm.

In accordance with the present invention, the laser polishing process discussed above could "relax" the convex surface of the fiber end face to achieve a more desirable flatter fiber end face (i.e., the radius of curvature of the fiber end face is larger after laser polishing as compared to the radius of curvature of the fiber end face prior to laser polishing). The following experimental results demonstrate that the benefits are achievable:

Case 1
Pre-laser polish radius of curvature of fiber end face=7.88 mm
Post-laser polish radius of curvature of fiber end face=8.82 mm
Case 2
Pre-laser polish radius of curvature of fiber end face=5.59 mm
Post-laser polish radius of curvature of fiber end face=12.07 mm Accordingly, laser polishing also can be effective to "correct" the radius of curvature of the fiber end face after it has been subject to rough polishing associated with shaping the ferrule end face, thus reducing return losses associated with the fiber end face.

Further, in the presence of a high index layer introduced by previous mechanical grinding and/or polishing at the fiber end face, it has been found that the laser polishing process in accordance with the present invention could also cause the fiber material in such layer to reduce in index of refraction, thus further reducing return losses. Thus if there is material having a high index film/layer present at the fiber end face prior to laser polishing, the index of refraction in that layer of material is decreased by the laser beam during laser polishing process. Accordingly, laser polishing also can be effective to "reconditioning" the index of refraction of the material at the fiber end face after mechanical grinding and/or polishing.

Figure 7A:
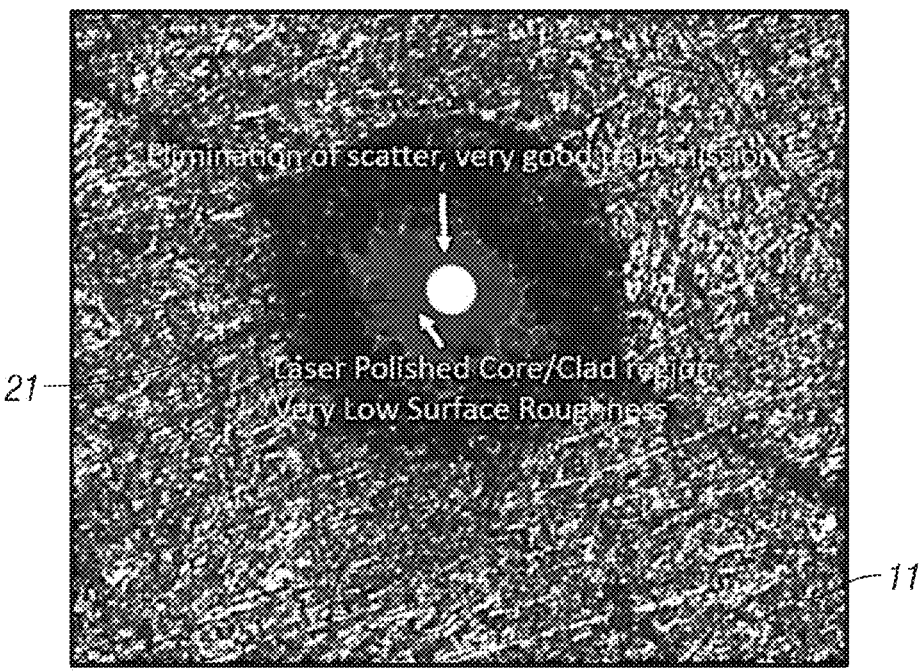
FIG. 7A is a photo image of the fiber/ferrule end face that have been subject to laser polishing after a pre-polish grind.
Figure 7B:
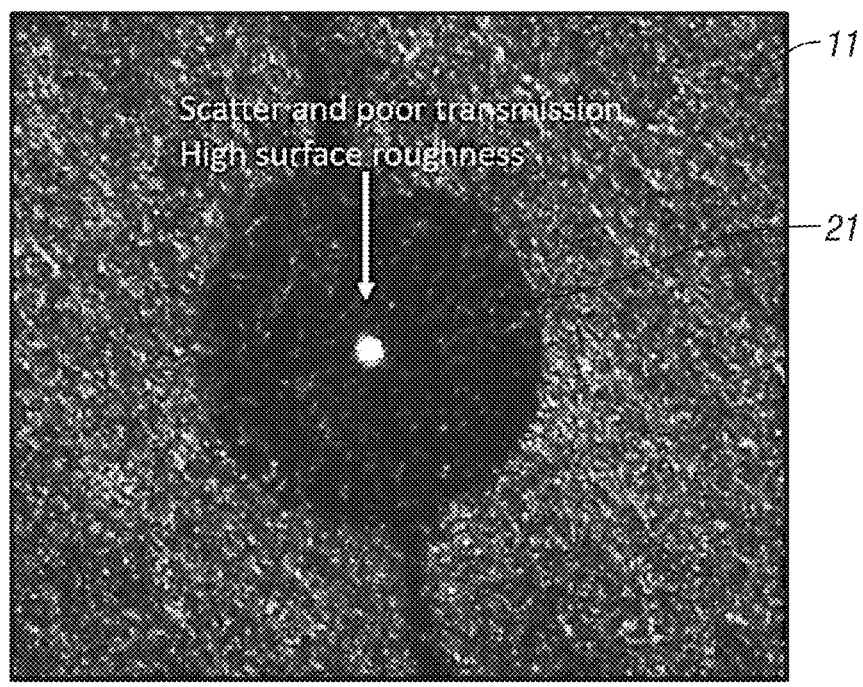
FIG. 7B is a photo image of the fiber/ferrule end face that have not been subject to laser polishing after a pre-polish grind.

FIGS. 7A-B are photo images providing a qualitative comparison of the end face region of the ferrule/fiber before and after laser polishing post rough grinding process. FIG. 7B depicts the fiber end face after a 12-micron rough grind in connection with ferrule end face shaping discussed above but before laser polishing. As shown, high surface roughness at the fiber end face would cause scattering and return loss. FIG. 7A depicts the fiber end face after laser polishing in connection with the present invention. The laser polished core/clad region of the fiber end face would significantly eliminate scatter to significantly improve optical transmission. Return losses are also significantly reduced after laser polishing.

Figure 8:
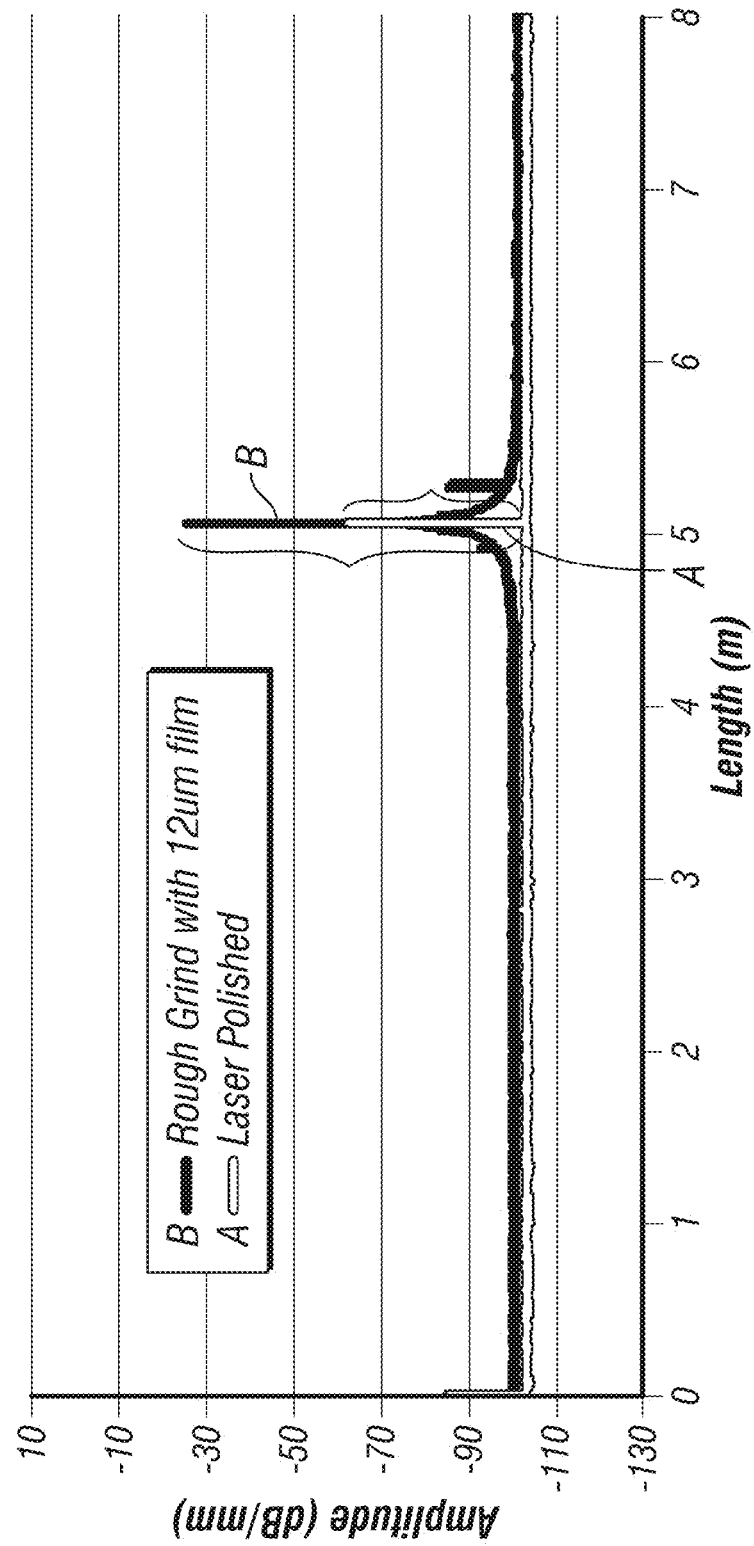
FIG. 8 is a graph comparing the losses for laser polishing and no laser polishing after a pre-polish grind.

FIG. 8 is a graph comparing the return losses for the fiber end face before and after laser polishing post rough grinding process. Curve B represents the losses encountered after a 12-micron rough grind of the fiber end face in connection with ferrule end face shaping discussed above but before laser polishing. Curve A represents the losses encountered after laser polishing the fiber end face in connection with the present invention. The return loss is significantly reduced after laser polishing, in fact the return loss is as good or even better after laser polishing by the process described herein.

FIG. 9 shows a table of the requirements for certain industry standards concerning insertion loss (IL) and return loss (RL) for single-mode optical fibers. Below the four standards in the last row in the table, the IL and RL data are presented for comparison, for a sampling of connectorized optical fibers (single-mode) having a "nPP Ferrolder®" metal ferrule, with the fiber end face laser polished in accordance with the present invention disclosed herein. As shown by the data in the last row, for the connectorized optical fibers that had been subject to laser polishing in accordance with the present invention, the average IL is less than all the requirements set forth within that column, and the average RL also meets or exceeds the corresponding requirements set forth with the right column, and in fact meets the more stringent "objectives" set forth by some of the standards.

Figure 10A:
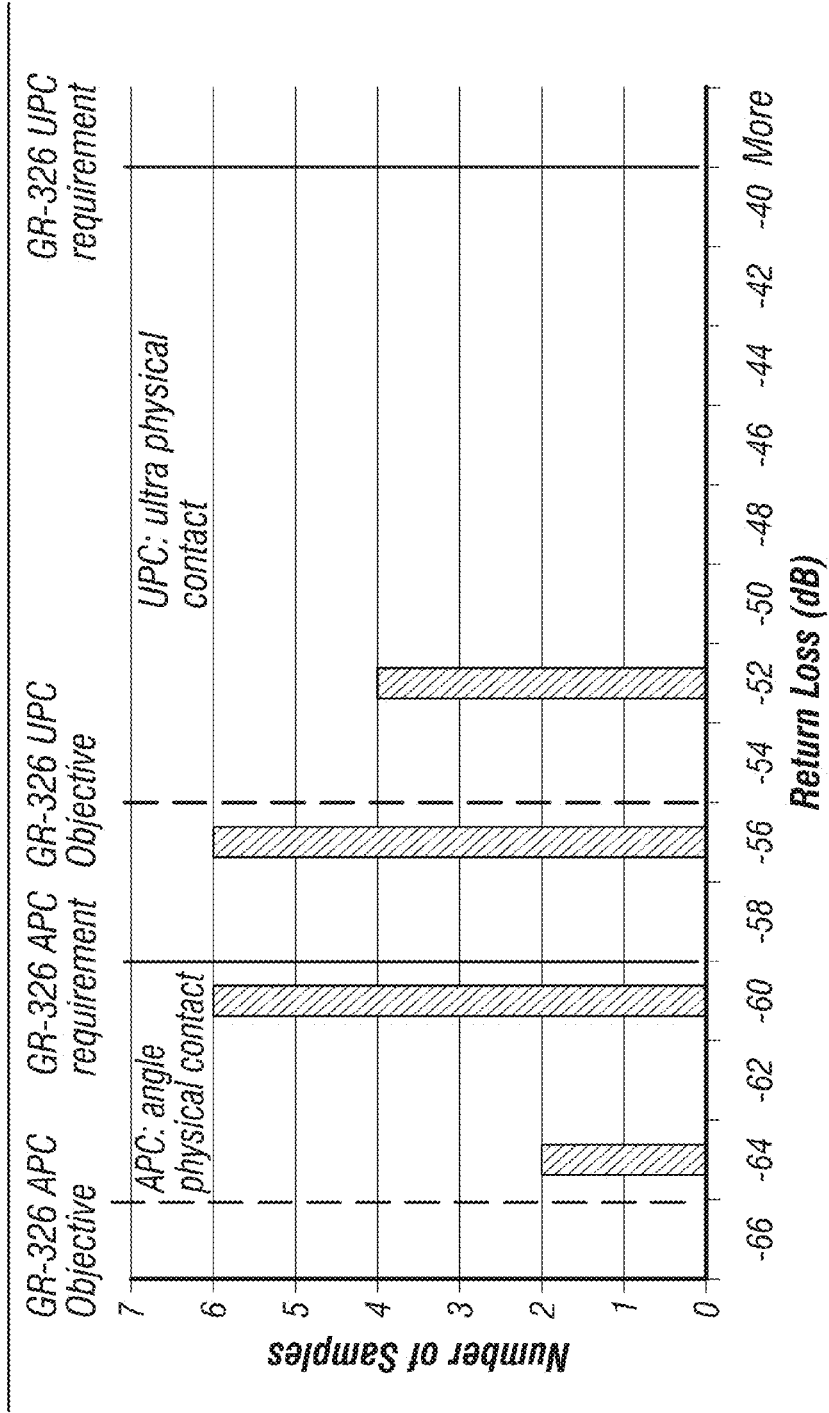
FIGS. 10A and 10B are histograms of comparing measured loss data of connectorized optical fibers laser polished in accordance with the present invention and mechanically polished.
Figure 10B:
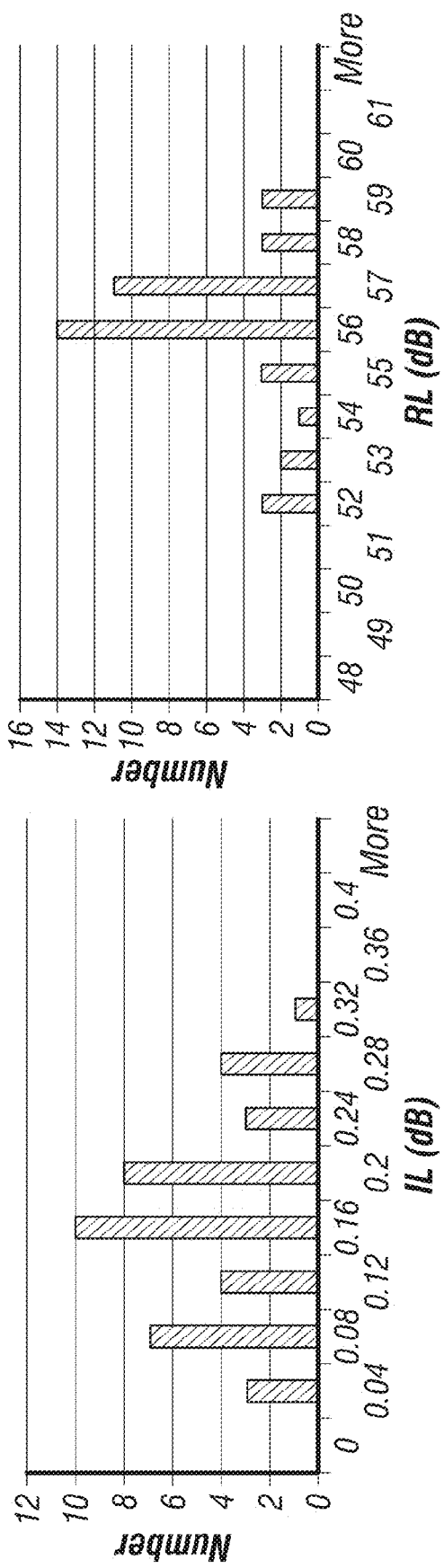

FIGS. 10A and 10B are histograms, comparing the IL losses for fiber end face of similar connectorized optical fibers subject to mechanical polishing and laser polishing. FIG. 10A represents the data of a sampling of a batch of 18 connectorized optical fibers (UPC; single-mode) having a "nPP Ferrolder®" metal ferrule, with the fiber end face (0-degree angle) laser polished in accordance with the present invention disclosed herein. In FIG. 10A, requirements of various industry standards are also identified in the histogram as a reference. As shown, for this sampling, all the RL data are significantly better than the minimum GR-326 UPC requirement, and some of the RL data exceeded the more stringent GR-326 UPC objective, with the best RL data close to the most stringent GR-326 APC objective (which is for an 8-degree angle polished fiber end face).

FIG. 10B represents the histograms for both the IL and RL data for a batch of 40 similar connectorized optical fibers that were mechanically polished. As shown, the RL date fail to meet any of the requirements shown in FIG. 10A.

Additional experimental results further demonstrated that the laser polished fiber end face is able to achieve return and insertion losses as well as surface roughness comparable or exceeding the prior art mechanical polishing processes.

In another aspect of the present invention, a connectorized optical fiber (e.g., in an optical fiber jumper cable) is formed in accordance with a process involving the novel laser polishing process discussed above. The process involves mounting an optical fiber in a metal ferrule as discussed above, cleaving the optical fiber close to the end face of the ferrule (alternatively, a cleaved length of optical fiber is mounted in the metal ferrule, with the fiber end face substantially aligned with the ferrule end face), pre-shaping the fiber end face (and ferrule end face) (e.g., by mechanical grinding or laser cleaving/shaping) as discussed above, and laser polishing the fiber end face in accordance with the present invention as discussed above. The fiber may be cleaved using known mechanical or laser cleaving processes. For example, U.S. Pat. No. 8,740,029 and U.S. Patent Application Publication No. US2014-0083273 A1 (which had been commonly assigned to the assignee of the present invention, and fully incorporated by reference herein) disclose mechanical scribing and cleaving processes.

The disclosed inventive laser polishing process consisted of a 2 second exposure of the fiber end face to the laser beam, which can substantially reduce both the time and consumable cost (e.g., costs of multi-step polishing films) associated with typical mechanical polishing methods. The inventive laser polishing a connectorized fiber also lends itself to full automation with a reduction in the number of steps involved throughout the polishing process.

\* \* \*

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

The invention claimed is:

1. A method of polishing an end face of a connectorized optical fiber, comprising:
   providing a ferrule made of metal;
   mounting an optical fiber in the ferrule, with a fiber end face exposed by a ferrule end face; and
   directing a laser beam at the fiber end face to polish the fiber end face, wherein the laser beam is directed generally perpendicular to the fiber end face, and wherein the laser beam is defocused on the fiber end face, with the fiber end face disposed at a predetermined distance from a focus of the laser beam.

2. The method of claim 1, wherein no mechanical polishing is required after the laser beam is applied to polish the fiber end face.

3. The method of claim 1, wherein the predetermined distance is larger than a diameter of the fiber end face.

4. The method of claim 3, wherein the laser beam has a spot size that is larger than a diameter of the fiber end face.

5. The method of claim 4, wherein the spot size is larger than the diameter of the fiber end face, so that the fiber end face receives portion of the laser beam which is generally uniform in beam distribution.

6. The method of claim 5, wherein the spot size is 2 to 20 times larger than the diameter of the fiber end face.

7. The method of claim 1, wherein the optical axis of the laser beam is misaligned with the center of the fiber end face.

8. The method of claim 1, wherein the laser beam is directed to polish the fiber end face to obtain a radius of curvature that is several times larger than a diameter of fiber end face.

9. The method of claim 8, wherein the radius of curvature is between 7 to 25 mm.

10. The method of claim 1, wherein the fiber end face has a first radius of curvature before polishing with the laser beam, wherein the laser beam is directed to polish the fiber end face to obtain a second radius of curvature, and wherein the second radius of curvature is larger than the first radius of curvature.

11. The method of claim 10, wherein the second radius of curvature is between 7 to 25 mm.

12. The method of claim 1, further comprising grinding the ferrule end face with the optical fiber mounted in the ferrule prior to directing the laser beam to polish the fiber end face.

13. The method of claim 12, wherein the fiber end face has a first radius of curvature after grinding but before polishing with the laser beam, wherein the laser beam is directed to polish the fiber end face to obtain a second radius of curvature, and wherein the second radius of curvature is larger than the first radius of curvature.

14. The method of claim 13, wherein the second radius of curvature is between 7 to 25 mm.

15. The method of claim 1, wherein the metal ferrule has at least one bore to receive the optical fiber for mounting, wherein there is no adhesive applied between the optical fiber and the ferrule.

16. The method of claim 1, wherein the ferrule comprises two ferrule halves, which together defines the bore, and wherein the optical fiber is mounted by clamping the ferrule halves together on the optical fiber received in the bore.

17. A connectorized optical fiber, comprising:
    a metal ferrule; and
    an optical fiber mounted in the ferrule, with a fiber end face exposed by a ferrule end face, wherein the fiber end face is polished by the method as in claim 1.

18. A method of polishing an end face of a connectorized optical fiber, comprising:
    providing a ferrule made of metal;
    mounting an optical fiber in the ferrule, with a fiber end face exposed by a ferrule end face; and
    directing a laser beam at the fiber end face to polish the fiber end face, wherein the laser beam is directed generally perpendicular to the fiber end face, and wherein the fiber end face has a layer of material having a first index of refraction after grinding but before polishing with the laser beam, wherein the laser beam is directed to polish the fiber end face to obtain a second index of refraction of the layer of material, and wherein the second index of refraction is smaller than the first index of refraction.

19. A method of forming a connectorized optical fiber, comprising:
    providing a ferrule made of metal;
    mounting an optical fiber in the ferrule, with a fiber end face exposed by a ferrule end face;
    grinding the ferrule with the optical fiber mounted therein prior to directing the laser beam to polish the fiber end face; and directing a laser beam at the fiber end face to polish the fiber end face, wherein the laser beam is directed generally perpendicular to the fiber end face, and wherein the fiber end face has a layer of material having a first index of refraction after grinding but before polishing with the laser beam, wherein the laser beam is directed to polish the fiber end face to obtain a second index of refraction of the layer of material, and wherein the second index of refraction is smaller than the first index of refraction.

20. The method of claim 19, wherein the fiber end face has a first radius of curvature after grinding but before polishing with the laser beam, wherein the laser beam is directed to polish the fiber end face to obtain a second radius of curvature, and wherein the second radius of curvature is larger than the first radius of curvature.

* * * * *